J. M. BRADLEY & C. F. PIKE.
EYEGLASS CASE.
APPLICATION FILED JULY 2, 1915.
1,240,536.
Patented Sept. 18, 1917.
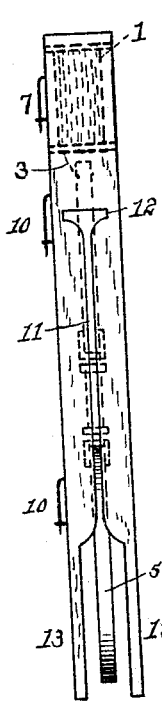
Fig. 1.
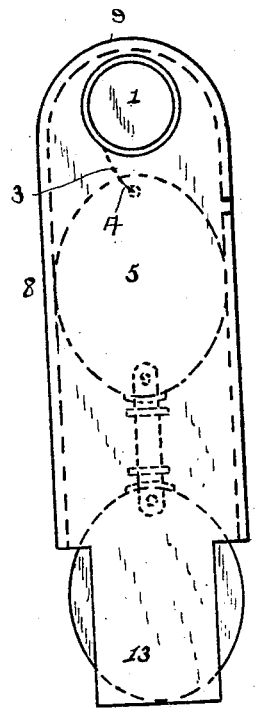
Fig. 2.
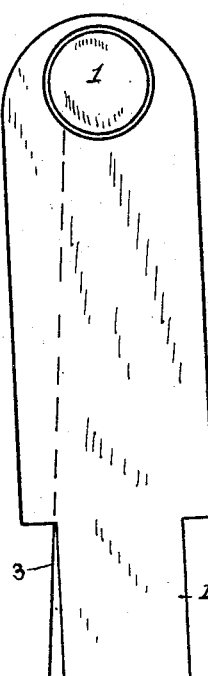
Fig. 3.
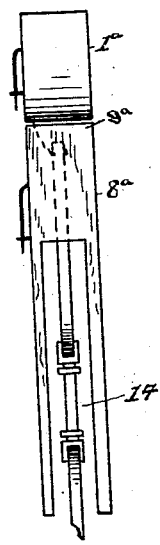
Fig. 4.
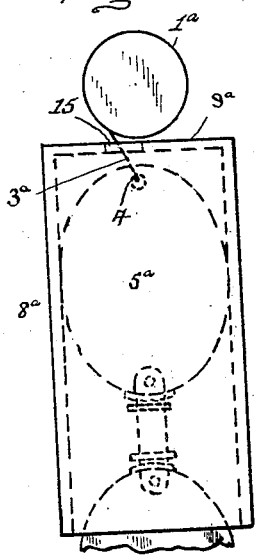
Fig. 5.
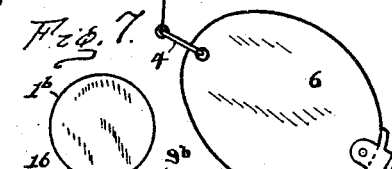
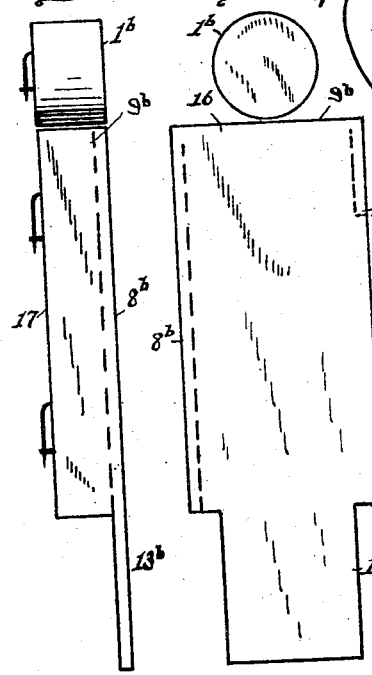
Fig. 6. Fig. 7. Fig. 8.
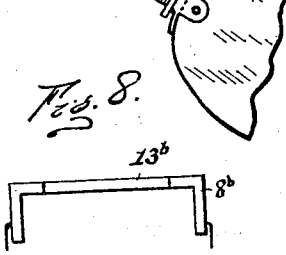
Inventor
John M. Bradley
Charles F. Pike
by Wm A. Pike
Attorney

UNITED STATES PATENT OFFICE.

JOHN M. BRADLEY AND CHARLES F. PIKE, OF PHILADELPHIA, PENNSYLVANIA.

EYEGLASS-CASE.

1,240,536.

Specification of Letters Patent. Patented Sept. 18, 1917.

Application filed July 2, 1915. Serial No. 37,764.

*To all whom it may concern:*

Be it known that we, JOHN M. BRADLEY and CHARLES F. PIKE, citizens of the United States, residing at Philadelphia, in the county of Philadelphia and State of Pennsylvania, have invented certain new and useful Improvements in Eyeglass-Cases, of which the following is a specification.

This invention relates to eyeglass cases and particularly to eyeglass cases in which the glasses are drawn into the case by means of a spring reel and a chain or cord.

The object of the invention is to provide an improved case to operate in conjunction with a reel separate therefrom and adapted to be removed from one garment to another, independent of the reel.

A further object of the invention is to provide eyeglass cases for use with a reel separate therefrom whereby the case may be constructed of materials to harmonize with different clothing, especially with the dresses of the ladies using the case, one reel serving for use with different cases.

With these objects in view, the invention consists in the improved construction, arrangement and combination of the parts of a reel and case of the character set forth which will be hereinafter fully described and afterward specifically claimed.

In order that the construction and operation thereof may be readily understood, we have illustrated the approved form of the invention, with modifications thereof, in the accompanying drawings, and will now proceed to fully describe the same in connection with said drawings, in which—

Figure 1 represents the improved case in edge elevation with a pair of glasses within the same, and a reel, the outline of the reel, and other parts, being shown in dotted lines.

Fig. 2 represents the eyeglass case in front elevation a pair of glasses being shown in the case in dotted lines and the reel case being shown in elevation in position in the opening in the case.

Fig. 3 represents the eyeglass case and reel case in front elevation with a pair of eyeglasses drawn out of the case but attached by a cord or chain to the reel, part of the cord being shown in dotted lines.

Figs. 4 and 5 represent, respectively, in edge and front elevation, a modification of the invention in which the reel is entirely separate from the case.

Figs. 6, 7 and 8 represent, respectively, an edge view, a front elevation, and a bottom plan view of another modification of the invention.

Wherever the same parts appear in a plurality of the figures of the drawings, they will be indicated by the same reference characters.

Referring specifically to Figs. 1, 2 and 3, 1 indicates a circular case containing a reel of any desired construction, a suitable opening being provided in the bottom of the case through which passes a cord or chain 3 adapted to be secured in any suitable manner, as for instance by links 4 at its outer end, to a pair of eyeglasses, as at 5 and 6.

This reel case is intended to be made of any suitable material which will be ornamental when secured by a pin 7 to a garment, for instance a lady's dress, and is intended for use on a number of such garments.

The eyeglass case is indicated at 8 and is preferably arched at its upper end, as at 9, and provided with an opening near said upper end, to fit snugly over the reel case. Suitable fastenings, as pins 10, are provided to secure the eyeglass case upon a garment, the case being thus removable from the garment without the necessity of removing the reel case, and vice versa, it being intended to provide, for use with a single ornamental reel case as before specified, any desired number of eyeglass cases made of material to harmonize with the different garments upon which they are secured.

This is the particular purpose of the invention and may be carried out, broadly, in a variety of ways. In the modifications shown in Figs. 4 to 8, the eyeglass case, indicated at 8ª in Figs. 4 and 5 and at 8ᵇ in Figs. 6 and 7, is finished off square at the top, as shown at 9ª and 9ᵇ. The reel case, being identical in construction with that of Figs. 1, 2 and 3, is likewise indicated by the numeral 1ª and 1ᵇ, but it is entirely outside of the eyeglass case, no circular openings being provided in the eyeglass case to receive the reel case.

The eyeglass case shown in Figs. 1, 2 and 3 is provided with a slot 11 which terminates at its upper end in an enlarged opening and at its lower end at the bottom of the main body of the case. Beyond this bottom the width of the case is decreased leaving at the front and rear only, extensions 13 between which the outer lens of the glass 5 is located when the glasses are in the case, as shown in Figs. 1 and 2, the edge of the lens projecting beyond the sides of the extensions so that they may be grasped with the thumb and finger, to insert and remove the glasses, without soiling the faces of the lenses.

The purpose of the slot 11 is to permit the cord 3 to pass therefrom in entering and removing the eyeglass, said slot being of a width to permit of the free passage of the cord without permitting the eyeglass to pass therefrom. The advantage of this construction is that the eyeglass may be inserted in and removed from the case in the usual manner and may be moved sidewise from the case, as soon as they leave the bottom thereof, without causing the cord or chain to rub on the bottom edge of the case, the cord or chain being free to move upward or downward in the slot 11 during the movement of the glasses, being especially free to move through the enlarged upper end 12 of the slot when the eyeglasses are raised to the level of the eyes.

In the construction shown in Figs. 4 and 5, the equivalent of the slot will be found in the space or slot 14 provided by removing the edge of the case from a point at or about the center of the inner lens of the eyeglass when inserted in the case. This removal of the edge face will not only permit the free movement of the cord in the space or slot 14 but will also permit the free removal and insertion of the eyeglasses through such space.

As before stated, the eyeglass case of Figs. 4 and 5 is separate from the reel case 1ª and as a consequence an opening 15 is provided in the top of the case to permit of the passage of the cord or chain 3ª into the interior of the case for attachment to the inner lens of the eyeglasses 5ª.

In the construction shown in Figs. 6, 7 and 8, the reel case 1ᵇ is the same as the reel cases of the other constructions and is entirely separate from the eyeglass case as in the construction of Figs. 4 and 5. Instead of the slot 11, in Figs. 1 to 3, or the slot 14, as in Figs. 4 and 5, the top and back of the eyeglass case of Figs. 6, 7 and 8 are removed, as shown at 16 and 17, and one edge removed from a point 18 to the bottom of the main body of the eyeglass case 8ᵇ, the front of the case being provided with an extension 13ᵇ, similar to the extensions 13 of Figs. 1 to 3.

By reason of the removal of the top of the case the cord 3ᵇ can pass freely from and into the eyeglass case and by the removal of the edge of the case from the point 18 of the bottom, both the cord and the eyeglasses may be freely removed laterally as well as vertically from the eyeglass case.

The side spaces or slots 14 may be provided in the construction described in the right hand edge of the case for the use of a right handed man, or in the left hand edge of the case for the use of a left handed man, or if so desired, in both edges of the case for the use of either a left or a right handed man. The extreme utility of the invention will be readily apparent from the foregoing description and it will be obvious that many slight changes and variations may be made from the specific construction described without departing from the spirit and scope of the invention.

Having thus fully described our invention, what we claim as new and desire to secure by Letters Patent of the United States is—

1. A reel case, in combination with an eyeglass case separated therefrom and provided with an opening in its top for the passage of a cord or chain from the reel and a second opening for the ingress and egress of the glasses carried by the cord.

2. An eyeglass case provided with an edge slot for the free passage and upward and downward movement of a cord attached to an eyeglass.

3. An eyeglass case provided with an edge slot for the free passage and upward and downward movement of an eyeglass and a cord attached thereon.

4. A reel case, means for the attachment thereof to a garment, an eyeglass case independent of the reel case, means for attaching the eyeglass case independently to a garment and openings between the interior of the reel case and the interior of the eyeglass case for the passage of a cord from the reel, an eyeglass, the eyeglass case being provided with an edge slot to permit lateral and vertical movement of the cord.

5. A reel case, means for securing it to a garment, an eyeglass case independent of the reel case and means for securing the eyeglass case to a garment, the top of the eyeglass case being removed to permit of the passage into the eyeglass case of a cord from the reel.

6. A reel case, means for securing it to a garment, an eyeglass case independent of the reel case and means for securing the eyeglass case to the garment, the top of the eyeglass case being removed to permit of the passage into the eyeglass case of a cord from the reel and a portion of one edge of the eyeglass case being also removed to permit of the free ingress and egress of the cord.

7. An eyeglass case for use with a reel case separate therefrom, the eyeglass case being provided with means for securing it to a garment and with an opening at each of its ends, one of said openings permitting of the removal and return of the glasses therethrough and the other permitting of the free movement therethrough of a reel cord carrying the glasses.

8. An eyeglass case provided with means for securing it to a garment and adapted to receive and protect eyeglasses carried by the cord of a separate reel, said case being open at both of its ends to permit the free ingress of the glasses and the free passage of the reel cord carrying the glasses.

9. An eyeglass case provided with means for attachment to a garment and open at both ends and along one of its sides, the end openings permitting of the free movement of a reel cord and the free ingress and egress of the glasses carried by the cord and the side opening permitting of lateral movement of both cord and glasses.

In testimony whereof we affix our signatures.

JOHN M. BRADLEY.
CHARLES F. PIKE.

Copies of this patent may be obtained for five cents each, by addressing the "Commissioner of Patents, Washington, D. C."